United States Patent
Lang et al.

(10) Patent No.: US 10,763,727 B2
(45) Date of Patent: Sep. 1, 2020

(54) HEAT EXCHANGER FOR ELECTRIC MACHINES WITH DOUBLE END TO CENTER COOLING

(71) Applicant: Siemens Industry, Inc., Alpharetta, GA (US)

(72) Inventors: Nicholas G. Lang, Cincinnati, OH (US); Rajendra Mistry, Cincinnati, OH (US)

(73) Assignee: SIEMENS INDUSTRY, INC., Alpharetta, GA (US)

( * ) Notice: Subject to any disclaimer, the term of this patent is extended or adjusted under 35 U.S.C. 154(b) by 238 days.

(21) Appl. No.: 15/690,857

(22) Filed: Aug. 30, 2017

(65) Prior Publication Data

US 2018/0062483 A1 Mar. 1, 2018

Related U.S. Application Data

(60) Provisional application No. 62/381,192, filed on Aug. 30, 2016.

(51) Int. Cl.
*H02K 9/04* (2006.01)
*H02K 9/12* (2006.01)

(52) U.S. Cl.
CPC ............... *H02K 9/04* (2013.01); *H02K 9/12* (2013.01)

(58) Field of Classification Search
CPC .................................. H02K 9/04; H02K 9/12
USPC ........................................................ 310/64
See application file for complete search history.

(56) References Cited

U.S. PATENT DOCUMENTS

| 4,348,604 A * | 9/1982 | Thode | H02K 9/18 165/166 |
|---|---|---|---|
| 4,657,072 A | 4/1987 | Mulock-Bentley | |
| 9,335,098 B2 | 5/2016 | Pawlick | |
| 2004/0084974 A1* | 5/2004 | Nelson | H02K 9/04 310/58 |
| 2004/0222711 A1* | 11/2004 | Klimt | H02K 9/18 310/59 |

(Continued)

FOREIGN PATENT DOCUMENTS

| CN | 1174194 A | 2/1998 |
|---|---|---|
| KR | 101459218 B1 | 11/2014 |
| WO | 0031485 A1 | 6/2000 |

OTHER PUBLICATIONS

Fundamentals of Heat Exchanger Design (Shah), p. 85, Figure 1.48(a), fluid 1 makes a single pass, and fluid 2 makes two passes.

(Continued)

*Primary Examiner* — Thienvu V Tran
*Assistant Examiner* — Bart Iliya

(57) ABSTRACT

An electric machine includes an enclosure housing multiple electrical components including a rotor assembly and a stator assembly, a heat exchanger coupled to the enclosure for cooling of the electrical components by creating an internal fluid flow circuit between the heat exchanger and the electrical components, wherein the heat exchanger comprises multiple cooling fluid inlets and a common cooling fluid outlet, wherein the multiple cooling fluid inlets are arranged so that cooling fluid enters the heat exchanger at different sections, and wherein the cooling fluid exits the heat exchanger through the common cooling fluid outlet.

15 Claims, 3 Drawing Sheets

(56) References Cited

U.S. PATENT DOCUMENTS

| | | | |
|---|---|---|---|
| 2008/0238224 A1* | 10/2008 | Ressel | H02K 9/18 310/64 |
| 2010/0026145 A1* | 2/2010 | Iwai | H02K 9/18 310/60 A |
| 2012/0326540 A1* | 12/2012 | Dorr | H02K 9/10 310/64 |
| 2016/0069624 A1* | 3/2016 | Rollins | F04D 25/028 415/122.1 |
| 2016/0116218 A1 | 4/2016 | Shedd et al. | |
| 2017/0163125 A1* | 6/2017 | Granat | H02K 1/32 |
| 2017/0303436 A1* | 10/2017 | Nyman | H02K 9/12 |

OTHER PUBLICATIONS

Air-cooled heat exchangers and cooling towers (Kroger), Figures 1, 3.

Using plate heat exchanger (PHE) for totally enclosed air-to-air cooled (TEAAC) motor Edward Chen; Gustav Nyman Publication Year: 2016, pp. 1-6.

* cited by examiner

HEAT EXCHANGER FOR ELECTRIC MACHINES WITH DOUBLE END TO CENTER COOLING

CROSS REFERENCE TO RELATED APPLICATIONS

This application claims benefit of U.S. Provisional Patent Application No. 62/381,192 filed Aug. 30, 2016, in the United States Patent and Trademark Office, the content of which is herein incorporated by reference in its entirety.

BACKGROUND

1. Field

Aspects of the present disclosure generally relate to electric machines, more specifically electrodynamic machines, which include for example electric motors, such as AC asynchronous motors, for example induction motors, and AC synchronous motors, as well as electric generators, and more particularly to heat exchangers with double end to center cooling for electric motors such as induction motors.

2. Description of the Related Art

Electrodynamic machines typically generate a large amount of heat during operation. Excessive heat can damage internal components, limit the amount of power that can be provided by the machine, and/or adversely affect the longevity of the machine. Electrodynamic machines may have fans or radial and/or axial vents that can remove at least some heat from the machine by drawing cooling air through various passageways in the machine.

Air cooled or inert gas cooled induction machines, including induction motors and generators, typically employ axial and/or radial vents for cooling purposes formed in a rotor assembly of the machine. Air cooled induction machines may further utilize air to air heat exchangers, for example coupled to an outside of a housing of the machine. Electric machines which utilize known air to air heat exchangers and a double end to center internal air circuit may have one end of the machine operate at a higher temperature than the other end because external air is entering one side of the machine and exhausting out at the opposite side of the machine. An overall or average machine temperature is also elevated due to ineffective cooling of one end of the machine. Known machines and/or air to air heat exchangers may be oversized to accommodate this design deficiency. Thus, a need exists to improve the cooling efficiency of induction machines without adversely affecting the performance of the machine.

SUMMARY

Briefly described, aspects of the present disclosure generally relate to electrodynamic machines, which include for example electric motors, such as AC asynchronous motors, for example induction motors, and AC synchronous motors, as well as electric generators, and more particularly to heat exchangers with double end to center cooling for electric motors such as induction motors.

A first aspect of the present disclosure provides an electric machine comprising an enclosure housing multiple electrical components including a rotor assembly and a stator assembly, a heat exchanger coupled to the enclosure for cooling of the electrical components by creating an internal fluid flow circuit between the heat exchanger and the electrical components, wherein the heat exchanger comprises multiple cooling fluid inlets and a common cooling fluid outlet, wherein the multiple cooling fluid inlets are arranged for cooling fluid to enter the heat exchanger at different sections, and wherein the cooling fluid exits the heat exchanger through the common cooling fluid outlet.

A second aspect of the present disclosure provides a cooling system comprising an electrodynamic machine comprising a rotor assembly comprising a lamination section positioned on a rotor shaft, and a stator assembly defining an annular core receiving the rotor assembly, the rotor assembly rotating within the stator assembly based on electromagnetic fields generated by the stator assembly and the rotor assembly, a heat exchanger comprising multiple cooling fluid inlets and a common cooling fluid outlet, wherein the heat exchanger is coupled to the electrodynamic machine creating an internal fluid flow circuit between the heat exchanger and the electrodynamic machine, and wherein the heat exchanger comprises multiple cooling fluid inlets and a common cooling fluid outlet, wherein the multiple cooling fluid inlets are arranged for cooling fluid to enter the heat exchanger at different sections, and wherein the cooling fluid exits the heat exchanger through the common cooling fluid outlet.

DETAILED DESCRIPTION

To facilitate an understanding of embodiments, principles, and features of the present invention, they are explained hereinafter with reference to implementation in illustrative embodiments. In particular, they are described in the context of being electrodynamic machines and heat exchangers of electric machines, in particular induction machines. Embodiments of the present invention, however, are not limited to use in the described devices or methods.

The components and materials described hereinafter as making up the various embodiments are intended to be illustrative and not restrictive. Many suitable components and materials that would perform the same or a similar function as the materials described herein are intended to be embraced within the scope of embodiments of the present invention.

Figure 1:
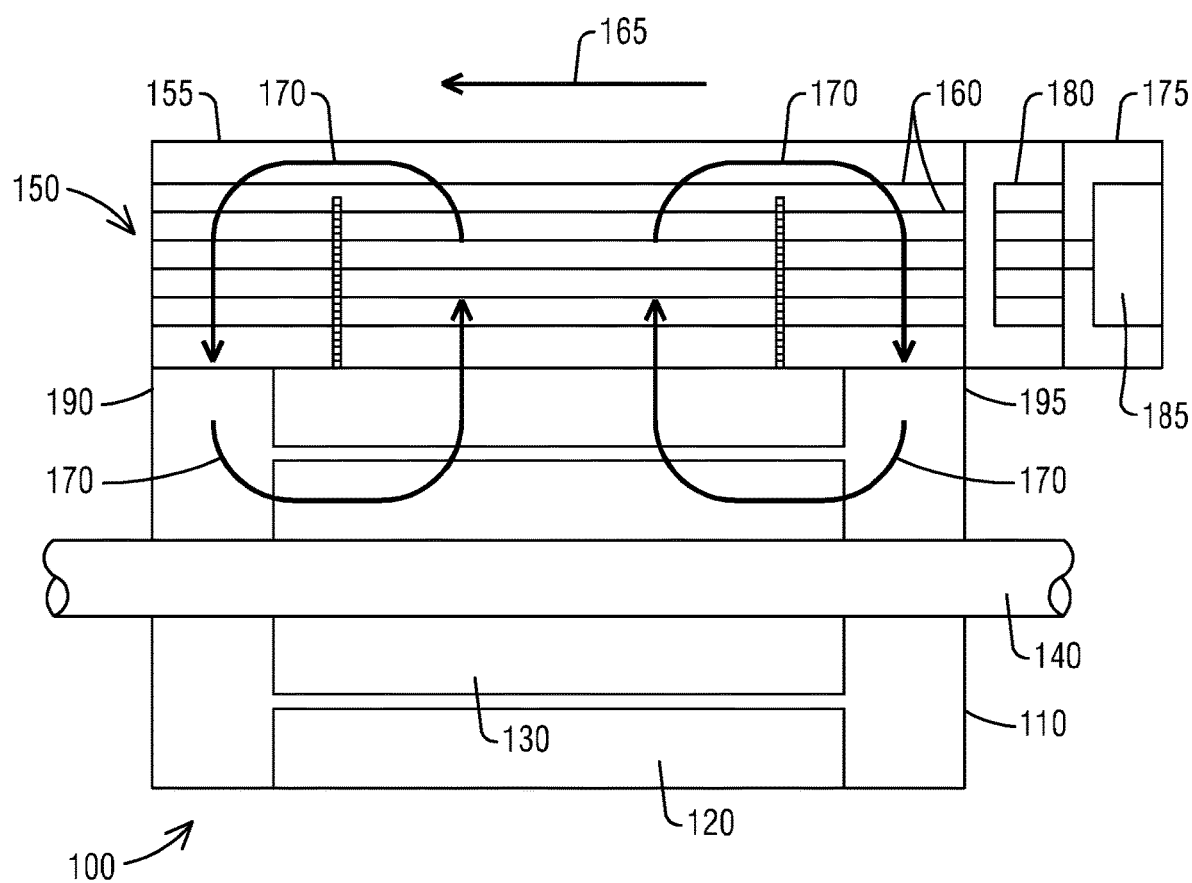
FIG. 1 illustrates a simplified partial cross section through an example of a known electrodynamic machine and heat exchanger in accordance with embodiments disclosed herein.

FIG. 1 illustrates a simplified partial cross section through an example of a known electrodynamic machine 100 and a heat exchanger 150 in accordance with embodiments disclosed herein. The electrodynamic machine 100 can be an induction motor or an induction generator. The exemplary machine 100 is configured as air cooled machine, specifically as totally enclosed fan cooled alternating current motor, it being understood that the present disclosure may be applied to other types of electrodynamic machines and electric motors that have a rotating mass. The machine 100 comprises a housing 110 and a stator assembly 120 circumferentially oriented therein. The stator assembly 120 forms a generally annular core into which is axially inserted a rotor assembly 130. The rotor assembly 130 has a shaft 140 onto which are typically affixed a stack of abutting rotor laminations (not illustrated). The rotor laminations, which are for example flat sheets of insulation coated ferromagnetic metal, e.g., pressed steel, are abutted to form the rotor core. Further, the machine 100 can comprise one or more fans positioned inside the housing 110, for example fans on each end of the shaft 140 and mounted to the shaft 140, which circulate air inside the motor housing 110 for cooling purposes. For simplicity, motor components that are not deemed necessary for one skilled in the art to make and use the present apparatus are not included in the figures.

FIG. 1 further illustrates heat exchanger 150 coupled to the machine 100 for cooling purposes. The heat exchanger 150 is a device for transferring heat from one medium to another, for example between a solid object and a fluid, or between two or more fluids. There are different types of heat exchangers, such as for example tube (or tubular) heat exchangers, plate heat exchangers, direct contact heat exchangers, etc. One of ordinary skill in the art is familiar with heat exchangers and it is noted that components of the heat exchanger 150 that are not deemed necessary for one of ordinary skill in the art to make and use the provided apparatus and system are not described herein. The heat exchanger 150 is coupled to the housing 110 of the machine 100, for example on an upper side of machine 100 when the machine 100 and heat exchanger 150 are installed and in operation.

The heat exchanger 150 can be configured as a tubular heat exchanger, also known as tube heat exchanger, where a series of tubes 160 located within a heat exchanger housing 155 comprises a cooling fluid that is heated and absorbs heat from another fluid, herein referred to as machine fluid or internal fluid, running over the series of tubes 160. The flow of the cooling fluid is shown by arrow 165, inside the series of tubes 160. The cooling fluid flows in an axial direction essentially parallel to the shaft 140 of the machine 100. A machine fluid runs over the series of tubes 160 so that the cooling fluid can absorb heat of the machine fluid. An internal fluid flow circuit of the machine fluid is illustrated by arrows 170.

Further, the heat exchanger 150 can be configured as a tubular air to air heat exchanger. The cooling fluid comprises air, in particular ambient or external air which flows in the series of tubes 160. The machine fluid comprises air, in particular hot air dissipating from the electric machine 100, specifically from the rotor assembly 130 and stator assembly 120, during operation of the machine 100. The cooling fluid comprises cold air which is heated by the hot air of the electric machine 100 so that heat of the machine fluid is transferred to the cooling fluid. Cold air as used herein comprises a temperature that is below or less than a temperature of the hot air, and vice versa (hot air comprises a greater or higher temperature than the cold air of the cooling fluid).

The air of the cooling fluid flows or runs through the series of tubes 160 as shown by arrow 165. A fan or blower motor 175 comprising a fan or blower 180 and an electric motor 185 are used to provide the cooling fluid, i.e. external air, which is forced into the cooling tubes 160. As FIG. 1 illustrates, the blower motor 175 is operably coupled to the heat exchanger 150 such that ambient air is drawn or absorbed in the heat exchanger 150, specifically in the series of tubes 160 of the heat exchanger 150.

The internal fluid flow circuit 170 of the machine fluid is configured as a double end to center internal fluid flow circuit. This means that the heat exchanger 150 and the machine 100 are configured such that the internal machine fluid flows in circles or loops at both ends (front end 190 and back end 195) between the machine 100 and the heat exchanger 150. The machine fluid flows from the ends 190, 195 of the machine 100 towards a center of the machine 100 in an axial direction, and then in a radial direction into a centric section of the heat exchanger 150. In the heat exchanger 150, the machine fluid is cooled down and a cooled machine fluid re-enters the machine 100 at both ends 190, 195 for cooling purposes of the machine 100, specifically the rotor assembly 130 and stator assembly 120. This cycle of the machine fluid is repeated at least for the duration when the machine 100 is in operation.

In further reference to FIG. 1, one end of the machine 100, specifically the front end 190, operates at a higher temperature than the other side, the back end 195, since the ambient or external air of the cooling fluid is entering at the back end 195 of the machine 100 and exhausting out at the opposite side, the front end 190. This pattern causes an increase in temperature of the cooling fluid before the cooling fluid reaches the front end 190 of the machine 100. In addition, an overall or average machine temperature is also elevated due to ineffective cooling of the front end 190.

Figure 2:
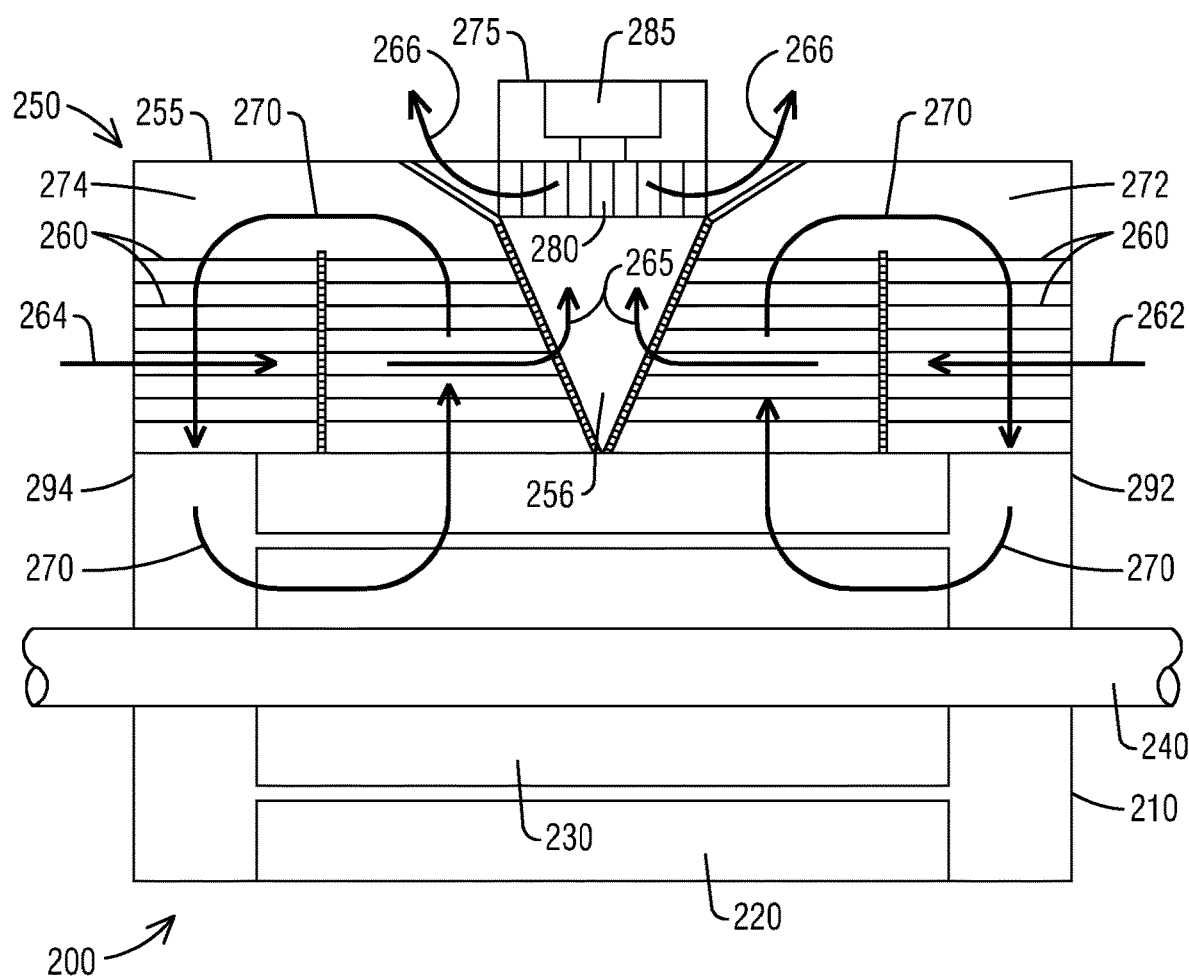
FIG. 2 illustrates a simplified partial cross section through an electrodynamic machine including heat exchanger in accordance with an exemplary embodiment of the present invention.

FIG. 2 illustrates a simplified partial cross section through an electrodynamic machine 200 including heat exchanger 250 in accordance with an exemplary embodiment of the present invention. The electrodynamic machine 200 can be an induction motor or an induction generator. The exemplary machine 200 is configured as air cooled machine, specifically as totally enclosed fan cooled alternating current motor, it being understood that the present disclosure may be applied to other types of electrodynamic machines and electric motors that have a rotating mass. The machine 200 comprises a housing 210 and a stator assembly 220 circumferentially oriented therein. The stator assembly 220 forms a generally annular core into which is axially inserted a rotor assembly 230. The rotor assembly 230 has a shaft 240 onto which are typically affixed a stack of abutting rotor laminations (not illustrated). The rotor laminations, which are for example flat sheets of insulation coated ferromagnetic metal, e.g., pressed steel, are abutted to form the rotor core. Further, the machine 100 can comprise one or more fans positioned inside the housing 110, for example fans on each end of the shaft 140 and mounted to the shaft 140, which circulate air inside the motor housing 110 for cooling purposes. For simplicity, motor components that are not deemed necessary for one skilled in the art to make and use the present apparatus and system are not included in the figures.

FIG. 2 further illustrates heat exchanger 250 coupled to the machine 200 for cooling purposes. The heat exchanger 250 is a device for transferring heat from one medium to another, for example between a solid object and a fluid, or between two or more fluids. The heat exchanger 250 is coupled to the housing 210 of the machine 200, for example on an upper side of machine 200 when the machine 200 and heat exchanger 250 are installed and in operation.

In an example, the heat exchanger 250 is configured as a tubular heat exchanger, where a series of tubes 260 are divided in two sections and located within a heat exchanger housing 255 comprises a cooling fluid that is heated and absorbs heat from another fluid, herein referred to as machine fluid or internal fluid, running over the series of tubes 260. The machine fluid runs over the series of tubes 260 so that the cooling fluid can absorb heat of the machine fluid.

In another example, the heat exchanger 250 is configured as a tubular air to air heat exchanger. The cooling fluid comprises air, in particular ambient or external air which flows in the series of tubes 260. The machine fluid comprises air, in particular hot air dissipating from the electric machine 200, specifically from the rotor assembly 230 and stator assembly 220, during operation of the machine 200. The cooling fluid comprises cold air which is heated by the hot air of the electric machine 200 so that heat of the machine fluid is transferred to the cooling fluid. Cold air as used herein comprises a temperature that is below or less than a temperature of the hot air, and vice versa (hot air comprises a greater or higher temperature than the cold air of the cooling fluid).

A fan or blower motor 275 comprising a fan or blower 280 and an electric motor 285 are used to provide the cold air of cooling fluid. The blower motor 275 is operably coupled to the heat exchanger 250 such that ambient air is drawn or absorbed from both ends in the heat exchanger 250, specifically in the series of tubes 260 of the heat exchanger 250.

In an exemplary embodiment, the heat exchanger 250 comprises multiple cooling fluid inlets represented using arrows 262, 264 and a common cooling fluid outlet represented using arrows 266, wherein the multiple cooling fluid inlets 262, 264 are arranged so that the cooling fluid enters the heat exchanger 250 at different sections or areas relative to the heat exchanger 250 and the machine 200, and wherein the cooling fluid exits the heat exchanger 250 through the common cooling fluid outlet 266 at a centric position or area of the heat exchanger 250 and thus at a centric position or area relative to the machine 200.

The heat exchanger 250 comprises at least two different sections 272, 274, spatially separated from each other and each section 272, 274 comprising a cooling fluid inlet 262, 264. Section 272 comprises inlet 262 and section 274 comprises inlet 264. As illustrated in FIG. 2, the sections 272, 274 are arranged on opposite sides within or inside the heat exchanger housing 255 so that the cooling fluid enters the heat exchanger 250 on opposite sides through the multiple cooling fluid inlets 262, 264. The heat exchanger can comprise more than the two cooling fluid inlets 262, 264 and more than the two opposite sections 272, 274. For example, the heat exchanger 250 may comprise four sections and four cooling fluid inlets. In case the heat exchanger 250 is configured as a cuboid with rectangular side surfaces, each side surface may comprise an inlet (see also FIG. 3).

A flow of the hot (cooling) fluid is illustrated by arrows 265. Ambient or external air of the cooling fluid is drawn in the heat exchanger 250 at the opposite inlets 262, 264 of the opposite sections 272, 274. The opposite sections 272, 274 correspond and are adjacent to opposite ends of the machine 200 (seen in axial direction), specifically to front end 292 and back end 294. The cooling fluid flows in axial direction, essentially parallel to the shaft 240, towards a centric section 256 of the heat exchanger 250. Then, the cooling fluid flows and joins in the centric section 256 and flows in a radial direction towards the common cooling fluid outlet 266. In an exemplary embodiment, the blower motor 275 comprises the common cooling fluid outlet 266, which means that hot or heated cooling fluid exits the heat exchanger 250 through the fan or blower 280. The common cooling fluid outlet 266 and the blower motor 275 are located at a centric position or centric area of the heat exchanger 250. Thus, the outlet 266 is also positioned centric relative to the machine 200 so that a temperature distribution within the machine 200 is equalized and uneven heating within the machine 200 eliminated.

An internal fluid flow circuit of the machine fluid is illustrated by arrows 270. The internal fluid flow circuit 270 of the machine fluid is configured as a double end to center internal fluid flow circuit. The heat exchanger 250 and the machine 200 are configured such that the internal machine fluid flows in circles or loops at both ends 292, 294 between the machine 200 and the heat exchanger 250. The machine fluid flows from the ends 292, 294 of the machine 200 towards a center of the machine 200 in an axial direction, and then in a radial direction into the centric section 256 of the heat exchanger 250. In the heat exchanger 250, the machine fluid is cooled down and a cooled machine fluid re-enters the machine 200 at both ends 292, 294 for cooling purposes, specifically for cooling of the rotor assembly 230 and stator assembly 220. This cycle of the machine fluid is repeated at least for the duration when the machine 200 is in operation.

Figure 3:
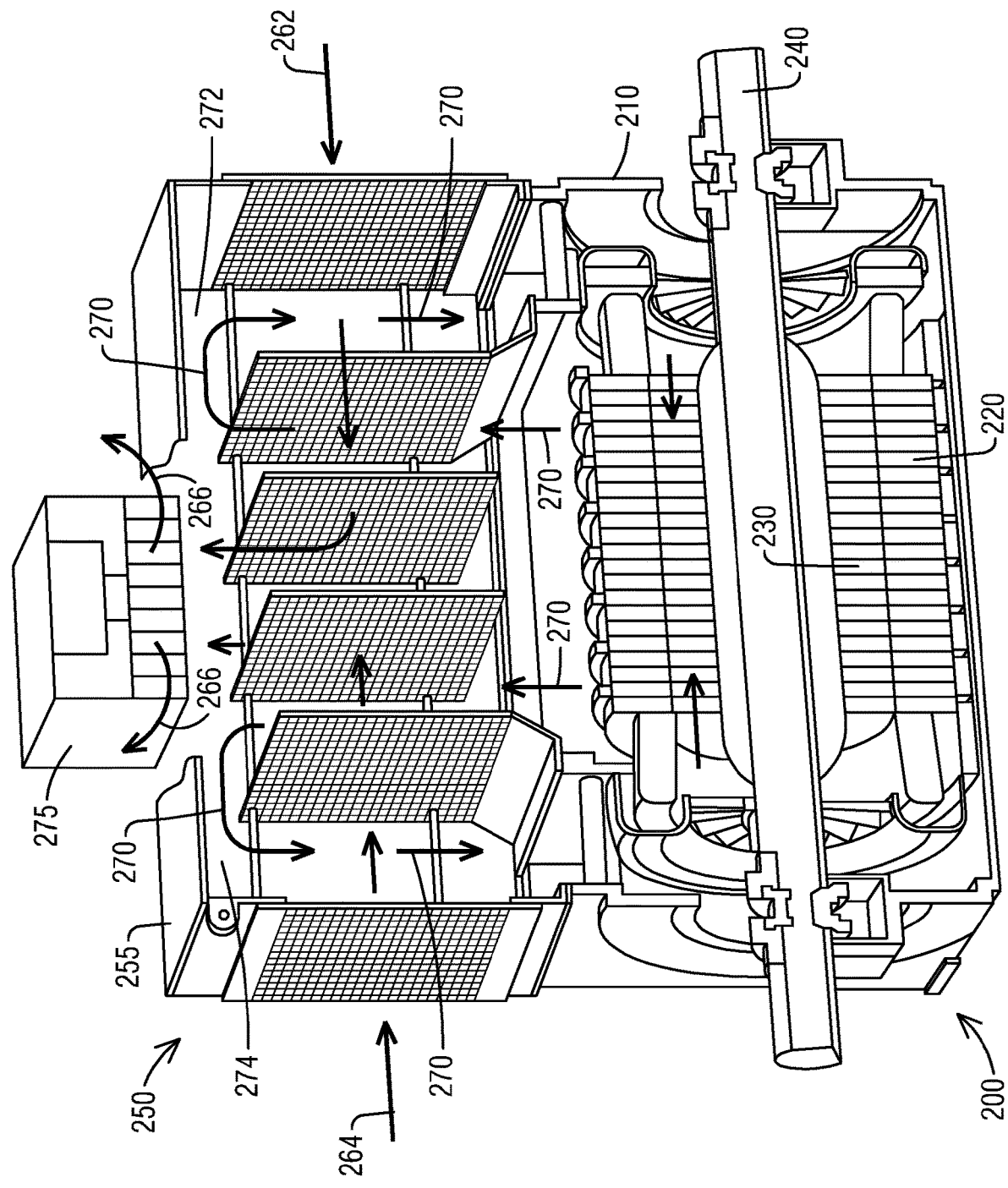
FIG. 3 illustrates a perspective view of an electrodynamic machine including a heat exchanger in accordance with an exemplary embodiment of the present invention.

FIG. 3 illustrates a perspective view of the electrodynamic machine 200 including the heat exchanger 250 as schematically illustrated in FIG. 2 in accordance with an exemplary embodiment of the present invention. The components of the electric machine 200 and heat exchanger 250 as described with reference to FIG. 2 are identical or similar to the components of FIG. 3. Thus, it is noted for details or components not mentioned in FIG. 3 it shall be referred to FIG. 2.

In an embodiment, the heat exchanger 250, for example the housing 255, comprises a shape or form of a cuboid with rectangular side surfaces. The enclosure 210 of the machine 200 also comprises rectangular side surfaces. When installed, the heat exchanger 250, in particular the housing 255 is flush with the enclosure 210 of the machine 200, and the heat exchanger 250 is installed on top of the machine 200. The heat exchanger 250 and the machine 200 comprise structure, for example flanges or mounting components, which allow the heat exchanger 250 to be mounted on an upper side of the machine 200.

As FIG. 3 illustrates, an upper surface of the enclosure 210 of the machine 200 is removed and a lower surface of the heat exchanger housing 255 is removed where the machine 200 and heat exchanger 250 are coupled together. Thus, a combined internal machine fluid flow circuit 270 is achieved. The heat exchanger 250 configured as air to air heat exchanger is split into the at least two sections 272, 274, each section 272, 274 comprising a cooling fluid inlet 262, 264. Further, the heat exchanger 250 comprises the common cooling fluid outlet 266 located at an essentially centric position of the blower motor 275. In fact, the blower motor 275 comprises the outlet 266.

The disclosed internal machine fluid flow circuit 270 in combination with the cooling fluid flow 265 as described in an exemplary embodiment with reference to FIG. 2 and FIG. 3 yield a counter flow heat exchange arrangement. For an equivalent heat exchanger (as illustrated for example in FIG. 1) pressure seen by the external blower 280 is reduced allowing for a higher operating point. Further, air velocities through the series of tubes 260 are cut in half yielding lower noise of the system. A cooling efficiency of the electric machine 200 is improved because temperatures at both ends 292, 294 of the machine 200 are now similar and comparable because cooling fluid enters now at both inlets 262, 264 which correspond and are adjacent to both ends 292, 294. In an example, a machine operating temperature rise may be reduced as much as 15° C. A distribution of temperatures inside the machine 200 is equalized, eliminating issues due to uneven heating (uneven thermal growth from end to end, abnormal rotor vibration, bearing temperatures, etc.), and machine power density or maximum loading is increased due to improved temperature rise.

While embodiments of the present invention have been disclosed in exemplary forms, it will be apparent to those skilled in the art that many modifications, additions, and deletions can be made therein without departing from the spirit and scope of the invention and its equivalents, as set forth in the following claims.

The invention claimed is:

1. An electric machine comprising:
an enclosure housing multiple electrical components including a rotor assembly and a stator assembly; and
a heat exchanger coupled to the enclosure for cooling of the electrical components by creating an internal fluid flow circuit between the heat exchanger and the electrical components,
wherein the heat exchanger comprises multiple cooling fluid inlets and a common cooling fluid outlet, wherein the multiple cooling fluid inlets are arranged for cooling fluid to enter the heat exchanger, and wherein the cooling fluid exits the heat exchanger through the common cooling fluid outlet, wherein the heat exchanger including:
two modular sections that divide a series of horizontal tubes in two sections,
a heat exchanger housing in which the two modular sections are located within,
a blower disposed above a centric section of the heat exchanger such that the cooling fluid flows and joins in the centric section and flows in a radial direction towards or away from the common cooling fluid outlet,
wherein the cooling fluid comprises air flowing through the series of horizontal tubes that are aligned in parallel to two cooling fluid inlets of the multiple cooling fluid inlets with openings thereof ending at both ends of the heat exchanger housing such that ambient air is drawn or absorbed directly from the both ends in the series of horizontal tubes, and
wherein there is a first internal fluid flow circuit on one side of the blower in a first modular section of the two modular sections of the heat exchanger and there is a second internal fluid flow circuit on other side of the blower in a second modular section of the two modular sections of the heat exchanger to yield a parallel or a counter flow heat exchange arrangement.

2. The electric machine as claimed in claim 1, wherein the two modular sections being spatially separated from each other and each section comprising a cooling fluid inlet.

3. The electric machine as claimed in claim 1, wherein the two modular sections are arranged on opposite sides of the heat exchanger so that internal fluid enters the heat exchanger through the multiple cooling fluid inlets on the opposite sides.

4. The electric machine as claimed in claim 1, wherein the heat exchanger comprises the blower configured to absorb external air as cooling fluid flowing through the multiple cooling fluid inlets.

5. The electric machine as claimed in claim 4, wherein the blower is configured to comprise the common cooling fluid outlet.

6. The electric machine as claimed in claim 5, wherein the blower and the common cooling fluid outlet are arranged so that the cooling fluid exits at a centric position relative to the electric machine.

7. The electric machine as claimed in claim 1, wherein the heat exchanger is configured as air to air heat exchanger, wherein an internal fluid to be cooled comprises air with a greater temperature than the cooling fluid, the cooling fluid absorbing heat from the internal fluid.

8. A cooling system comprising:
an electrodynamic machine comprising
a rotor assembly comprising a lamination section positioned on a rotor shaft;
a stator assembly defining an annular core receiving the rotor assembly, the rotor assembly rotating within the stator assembly based on electromagnetic fields generated by the stator assembly and the rotor assembly; and
a heat exchanger comprising multiple cooling fluid inlets and a common cooling fluid outlet,
wherein the heat exchanger is coupled to the electrodynamic machine creating an internal fluid flow circuit between the heat exchanger and the electrodynamic machine,
wherein the heat exchanger comprises multiple cooling fluid inlets and a common cooling fluid outlet, wherein the multiple cooling fluid inlets are arranged for cooling fluid to enter the heat exchanger, and wherein the cooling fluid exits the heat exchanger through the common cooling fluid outlet, wherein the heat exchanger including:
two modular sections that divide a series of horizontal tubes in two sections,
a heat exchanger housing in which the two modular sections are located within,
a blower disposed above a centric section of the heat exchanger such that the cooling fluid flows and joins in the centric section and flows in a radial direction towards or away from the common cooling fluid outlet,
wherein the cooling fluid comprises air flowing through the series of horizontal tubes that are aligned in parallel to two cooling fluid inlets of the multiple cooling fluid inlets with openings thereof ending at both ends of the heat exchanger housing such that ambient air is drawn or absorbed directly from the both ends in the series of horizontal tubes, and
wherein there is a first internal fluid flow circuit on one side of the blower in a first modular section of the two modular sections of the heat exchanger and there is a second internal fluid flow circuit on other side of the blower in a second modular section of the two modular sections of the heat exchanger to yield a parallel or a counter flow heat exchange arrangement.

9. The cooling system of claim 8, wherein the electrodynamic machine is configured as alternating current (AC) induction motor.

10. The cooling system of claim 8, wherein the heat exchanger is configured as tubular air to air heat exchanger.

11. The cooling system of claim 8, wherein the cooling fluid comprises external air, and wherein the cooling fluid flows in axial and radial direction through the heat exchanger.

12. The cooling system of claim 11, wherein the heat exchanger comprises the blower configured to absorb the external air as cooling fluid entering through the multiple cooling fluid inlets.

13. The cooling system of claim 8, wherein the internal fluid flow circuit comprises air dissipating from the electrodynamic machine and flowing in a double end to center configuration between the electrodynamic machine and the heat exchanger.

14. The cooling system of claim 8, wherein the common cooling fluid outlet of the heat exchanger is positioned in the centric section of the heat exchanger.

15. The cooling system of claim 8, wherein the heat exchanger comprises the two modular sections are opposite sections and each section comprises a cooling fluid inlet.

* * * * *